May 3, 1932.  E. A. LEDERER  1,856,257
RECTIFIER
Filed July 29, 1924  2 Sheets-Sheet 1

INVENTOR
ERNEST A. LEDERER
BY
ATTORNEY

May 3, 1932.                E. A. LEDERER                1,856,257
                              RECTIFIER
                        Filed July 29, 1924          2 Sheets-Sheet 2

INVENTOR
ERNEST A. LEDERER
BY
ATTORNEY

Patented May 3, 1932

1,856,257

UNITED STATES PATENT OFFICE

ERNEST ANTON LEDERER, OF BLOOMFIELD, NEW JERSEY, ASSIGNOR TO WESTINGHOUSE LAMP COMPANY, A CORPORATION OF PENNSYLVANIA

RECTIFIER

Application filed July 29, 1924. Serial No. 728,983.

This invention relates to a rectifier for electric currents and more particularly to an electronic rectifier for converting alternating electric current into direct current in which the discharge takes place between electrodes in a rarefied gaseous atmosphere.

This invention is especially adapted for rectifying the alternating current of the ordinary lighting circuit of 110 or 220 volts although it may be applied equally well to either higher or lower voltages.

Heretofore, the current for the plate circuit of radio receiving apparatus has been supplied almost exclusively by batteries. Batteries, however, are not an efficient source of electricity and in the case of receiving apparatus employing a large number of tubes, the batteries quickly become exhausted and require frequent replacing or recharging. It has long been recognized, therefore, that it would be highly desirable to employ the house lighting circuit for supplying current for this purpose.

The use of such a source of current supply, however, involves considerable difficulty and so far as it is known, apparatus heretofore designed for this purpose, has been complicated, inefficient and expensive and has involved the use of delicate parts which are costly and have a comparatively short life.

Among the objects of this invention, is to provide a simple, efficient and rugged rectifier which will have a long commercial life. Another object is to provide a rectifier adapted for use with other suitable apparatus to provide the plate current for radio tubes from an alternating current source.

Another object is to provide a rectifier operable at low amperage and adapted to convert into direct current both the positive and negative portion of the alternating current wave.

Another object is to provide a rectifier having a low starting potential.

Other objects and advantages will hereinafter appear.

In accordance with this invention, the rectifier comprises an envelope containing a gas at a relatively low pressure, preferably a rare gas as neon or helium or a mixture of rare gases, a plurality of electrodes which may, for convenience, be termed ionizing electrodes arranged relatively close together and adapted to have alternating current impressed thereon to produce a low potential discharge to ionize the gaseous medium within the envelope, and one or more additional electrodes cooperating with the ionizing electrodes to rectify the alternating current impressed thereon.

The filling of rare gas reduces the starting potential of the rectifier. The cathode fall and consequently the potential drop between the electrodes from which direct current is obtained, may be further reduced by coating the cathode with an alkali metal such as potassium, sodium, rubidium, cæsium, lithium or alloys thereof, preferably vaporized onto the cathode after it is sealed into the envelope.

A rectifier embodying this invention using potassium metal on the cathode and having a filling of neon gas, has been operated on potentials of 220 volts and direct current obtained therefrom at approximately 150 volts with a current flow of from 0.5 to 120 milliamperes. The output voltage, however, may be varied by varying the alkali metal used on the cathode or by varying the character of the gas used in the rectifier. The current capacity of the rectifier is limited by the temperature at which the cathode may be operated, and this in turn is limited by the vaporization temperature of the alkali metal used on the cathode. The current capacity of the rectifier may therefore be increased by increasing the heat radiating area of the cathode or by providing cooling means therefor. A cathode of this latter type has been operated with a current discharge as high as two amperes.

The discharge passage between the electrodes from which direct current is obtained, may be constricted in cross section and the cathode may be made relatively large to produce a positive column discharge and the potential drop between the electrodes and consequently the output voltage may be varied by varying the length of the positive column.

The positive and negative portions of the alternating current wave, may be rectified separately and two sources of intermittent direct current obtained or they may be combined to produce a continuous direct current.

If it is desired to use the rectifier for supplying current for the plate circuit of radio receiving apparatus, the direct current so obtained, may be rendered substantially constant and uniform by means of smoothing condensers and inductance coils and the voltage may be suitably controlled by rheostats or equivalent means.

In order that this invention may be more fully understood, reference is had to the accompanying drawings in which, Fig. 1 is a sectional view of a rectifier embodying this invention.

Figure 1:
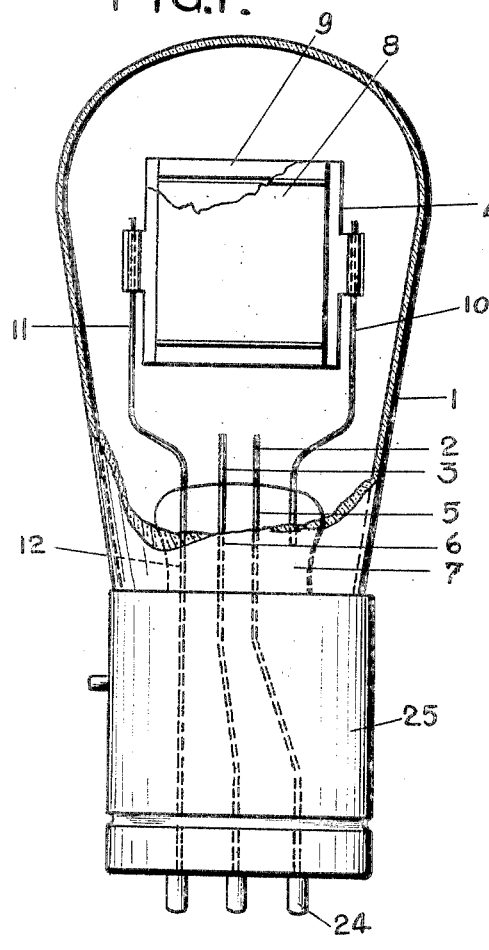

The rectifier shown in Fig. 1 comprises an envelope 1 having a filling of rare gas such as neon or helium or a mixture of rare gases, a pair of electrodes 2 and 3 between which an alternating current discharge is adapted to take place and a cathode 4 cooperating with the electrodes 2 and 3, to produce direct current discharge. The electrodes 2 and 3 are of comparatively small area and are arranged relatively close together for a purpose which will hereinafter appear. These electrodes are connected to or form continuations of the lead wires 5 and 6 respectively, which are sealed through the stem 7 of the device. Preferably, they are composed of a refractory metal as tungsten, molybdenum, nickel, etc. The cathode 4 may take the form of a pair of parallel plates 8 and 9 of a metal having a low cathode drop, as aluminum or nickel having inwardly turned extensions joined together and to support wires 10 and 11, sealed into the press of the stem 7. The support 11 is connected to or forms a continuation of the lead wire 12.

The gas within the tube is at a relatively low pressure preferably between 4 and 6 mm. of mercury.

An alkali metal as potassium may be distilled into the tube and deposited upon the cathode 4 after it is sealed therein. This serves to lower the cathode drop and permit a relatively low potential discharge to take place between the electrode 4 and the electrodes 2 and 3.

The alternating current is impressed upon the electrodes 2 and 3 and a discharge obtained therebetween which ionizes the gas within the envelope and still further reduces the potential required to cause the discharge to take place between these electrodes and the cathode 4. The discharge takes place in one direction only, the electrode 4 serving as a cathode alternately for the electrodes 2 and 3. The electrode 4, because of its large surface and because of the coating of potassium metal, has a relatively small cathode drop as compared to the electrodes 2 and 3. It would, therefore, require a much higher voltage to produce a discharge between the electrode 4 and either the electrodes 2 and 3 when they are negative, than when they are positive. By suitably proportioning the size and shape of these electrodes and the gas pressure within the device, the discharge in one direction may be entirely suppressed and a discharge reproduced alternately between the electrodes 2 and 4 and electrodes 3 and 4. It will thus be noted that both the positive and negative portions of the current are utilized and a continuous direct current produced.

Rectifiers made in accordance with this invention containing a gas pressure of from ½ to 15 mm. have been found to operate satisfactorily.

Figure 2:
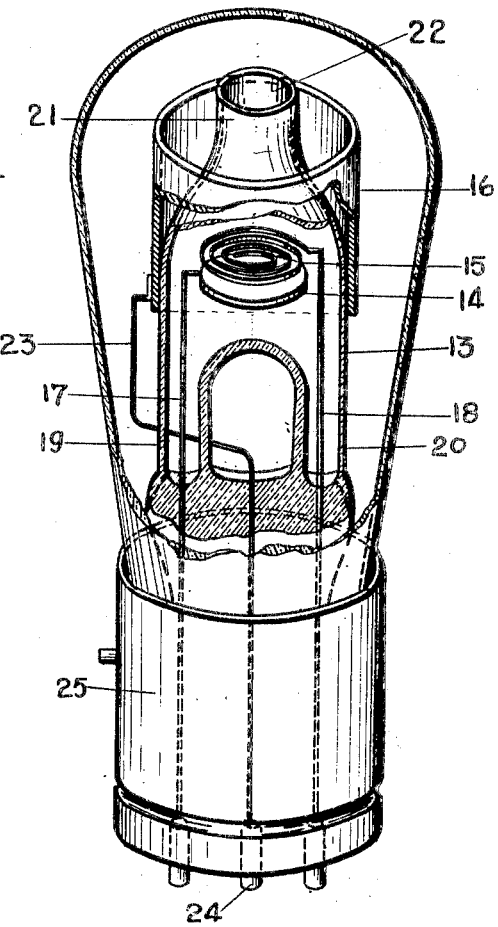
Fig. 2 is a sectional view of a modified form of rectifier.

In Fig. 2, a modified form of rectifier is shown in which a tubular chamber 13 is provided in which electrodes 14 and 15 are arranged and outside of which a third electrode 16 is located. Electrode 14 is composed of a plate of metal having a low cathode drop as aluminum, welded or otherwise suitably secured to the leading-in conductor 17. Electrode 15 is in the form of a metallic grid or coil preferably of aluminum spaced longitudinally from the electrode 14 a relatively short distance, whereby a low potential discharge is obtained therebetween.

Electrode 15 is supported by a leading-in wire 18 and the leading-in wires 17 and 18 are contained within tubular legs 19 and 20, which latter form extensions of the chamber 13 and are fused to the reentrant stem of the rectifier. The leading-in wires are sealed in the stem. The outer portion 21 of the chamber 13 is reduced in cross section and has an opening 22 forming a constricted discharge passage between the outside electrode 16 and the electrodes 14 and 15. The electrode 16 comprises a cylinder of metal, as aluminum, or nickel supported by the chamber 13 although it may be of any other desired form and be suitably supported without the chamber. Leading-in wire 23 is suitably secured to the electrode 16 as by welding.

The discharge between the electrodes 14 and 15, due to their arrangement longitudinally of the chamber 13, takes place in an axial direction and thereby serves to more efficiently ionize the gas within the chamber.

The leading-in wires in the form shown in both Fig. 1 and Fig. 2 are connected to suitable terminals 24 in the base 25 of the rectifier.

Figure 3:
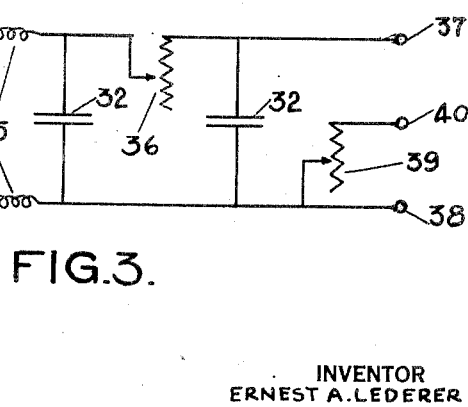
Fig. 3 is a diagram arrangement which may be employed for obtaining substantially uniform direct current from an alternating current source.

Fig. 3 shows an arrangement for supplying a direct current for any desired purpose as, for instance, supplying current for radio tubes. The alternating current source 27 for instance the ordinary commercial lighting circuit of 110 volts, is stepped up by a transformer 28, the opposite ends of the secondary winding of which are connected to the electrodes 2 and 3 of the rectifier. Direct current is obtained between the third electrode 4 of the rectifier and the central portion of the secondary of the transformer 28 and the irregularities of such current are smoothed out in any desired manner as by shunting a number of condensers 32 across the conductors 33 and 34 and introducing inductance coils 35 in series in the lines. The voltage between the lines 33 and 34 may be controlled by a suitable rheostat 36.

With a line voltage of 110 volts stepped up by the transformer 28 to 220 volts, a voltage across the lines 33 and 34 of approximately 150 volts may be obtained. After the current has been smoothed out by the condensers 32 and inductance coils 35, a voltage may be obtained at the terminals 37 and 38 of about 110 volts.

This voltage, however, may be varied between wide limits by the rheostat 36 and may be used to supply the radio frequency and amplification tubes of a radio receiving apparatus. The current for the detector tube of the radio receiving apparatus may be further reduced in voltage by a rheostat 39 and a potential of from 20 to 60 volts obtained between the terminals 38 and 40.

Figure 4:
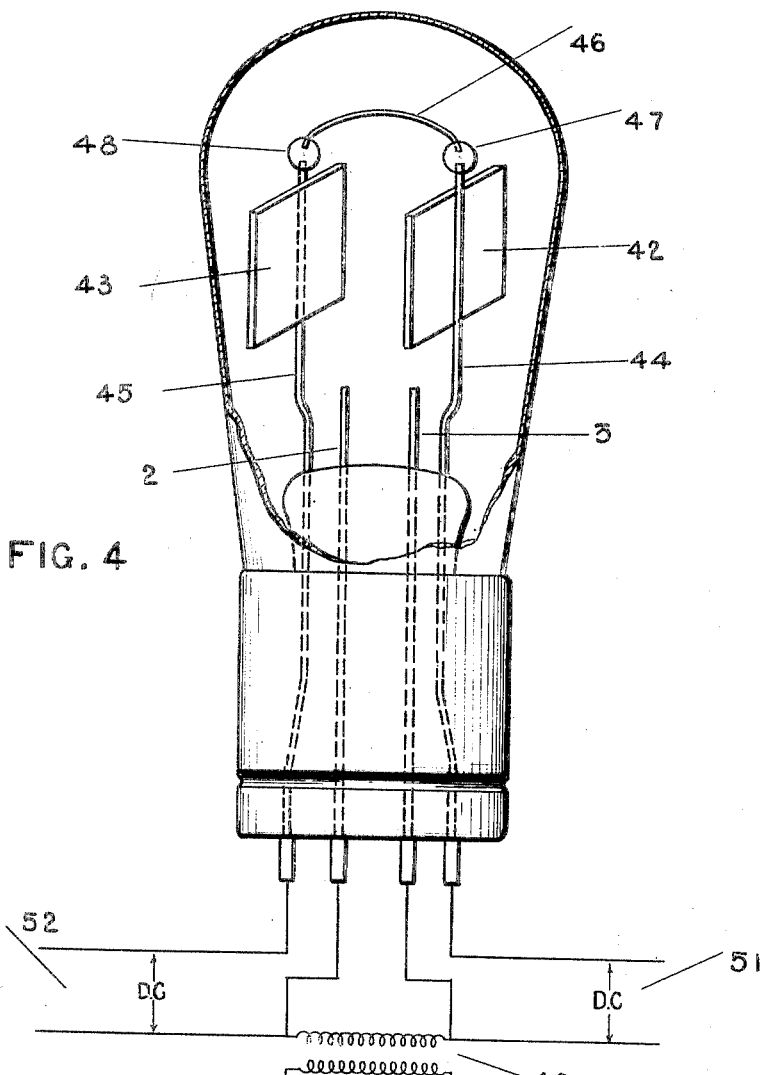
Fig. 4 is a sectional view of another form of rectifier.

The rectifier shown in Fig. 4 is provided with two separate cathodes 42 and 43 welded or otherwise suitably secured to support wires 44 and 45, respectively. The electrodes supporting structure may be rendered more rigid by a brace 46 connected to the upper ends of the support wires 44 and 45 through the insulating beads 47 and 48. The ionizing electrodes 2 and 3 are connected to the secondary winding of the transformer 49 on which electrical current is impressed from an alternating source 50.

The electrode 42 serves as a cathode for the ionizing electrode 2 and the electrode 43 serves as a cathode for the ionizing electrode 3. It will thus be noted that an intermittent discharge takes place alternately between the electrodes 2 and 42 and the electrodes 3 and 43. The electrodes 42 and 43 are connected in independent circuits 51 and 52 and an intermittent direct current obtained in each circuit.

Figure 5:
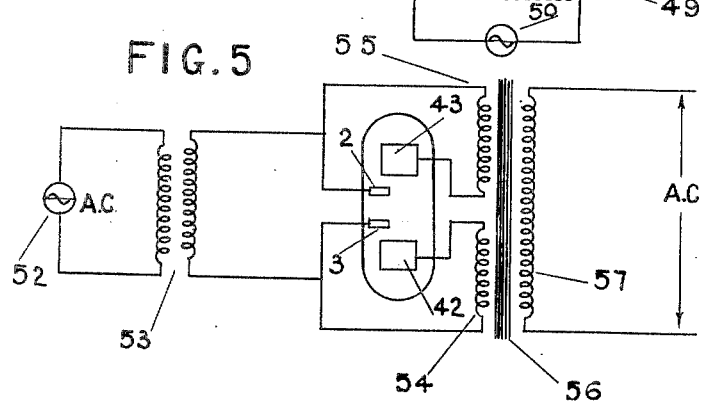
Fig. 5 is a diagram arrangement showing one manner of using the rectifier shown in Fig. 4.

Fig. 5 illustrates diagrammatically, an arrangement for obtaining from an alternating current source, a current of double frequency. The alternating current source 52 is impressed through the transformer 53 on the ionizing electrodes 2 and 3 and the cathodes 42 and 43 are connected to the primary windings 54 and 55 respectively, of a transformer 56. An intermittent pulsating direct current is produced alternately in the windings 54 and 55 which induces in the secondary 57 of the transformer, alternating current of double the frequency of that of the source 52.

Other uses of the two sources of intermittent direct current produced by the rectifier illustrated in Fig. 4 are readily apparent, that shown in Fig. 5 being by way of example only.

It will be understood that this invention is not limited to the exact details of construction shown and described and that the different phases thereof may be embodied in different forms without departing from this invention.

What is claimed is:

A gaseous discharge device comprising an envelope having a press and containing a monatomic gas at a reduced pressure, a pair of anodes therein in substantially unshielded close spaced relationship, said anodes being of relatively small area to permit a discharge to pass therebetween sufficient to ionize said gas at normal operating voltages and a cathode operating in the absence of thermionic emission, said cathode being of a large size relative to the anodes, whereby when an alternating current is applied between each of the anodes and the cathode, the discharge in one direction is substantially suppressed, said cathode being supported by the press and having a coating of a low voltage drop material thereon, the space intervening between both anodes and the cathode being unobstructed.

In testimony whereof, I have hereunto subscribed my name this 26th day of July, 1924.

ERNEST ANTON LEDERER.